United States Patent
Chippa et al.

(10) Patent No.: US 10,552,240 B2
(45) Date of Patent: Feb. 4, 2020

(54) AUTOMATICALLY GENERATING EFFICIENT REMOTE PROCEDURE CALL (RPC) CODE FOR HETEROGENEOUS SYSTEMS

(71) Applicant: International Business Machines Corporation, Armonk, NY (US)

(72) Inventors: Ashok N. Chippa, Mountain View, CA (US); Glen Darling, San Jose, CA (US); Hoang-Nam Nguyen, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 14/477,715

(22) Filed: Sep. 4, 2014

(65) Prior Publication Data
US 2016/0070609 A1    Mar. 10, 2016

(51) Int. Cl.
*G06F 15/16*    (2006.01)
*G06F 9/54*    (2006.01)
*H04L 29/08*    (2006.01)

(52) U.S. Cl.
CPC .......... *G06F 9/547* (2013.01); *H04L 67/1002* (2013.01)

(58) Field of Classification Search
CPC ..... G06F 9/547; G06F 13/4013; H04L 67/40; H04L 67/1002
USPC ........................................................ 709/219
See application file for complete search history.

(56) References Cited

U.S. PATENT DOCUMENTS

| | | | | |
|---|---|---|---|---|
| 6,249,822 B1* | 6/2001 | Kays, Jr. | ................ | G06F 9/547 719/330 |
| 6,611,868 B1* | 8/2003 | Arutyunov | .......... | H04L 12/2856 709/227 |
| 8,332,539 B2 | 12/2012 | Srinivasan et al. | | |
| 2001/0049752 A1* | 12/2001 | Kays, Jr. | ................ | G06F 9/547 719/330 |
| 2002/0149604 A1* | 10/2002 | Wilkinson | ........ | G06F 17/30994 345/643 |
| 2002/0161820 A1* | 10/2002 | Pellegrino | ................ | G06F 8/20 709/201 |
| 2003/0225889 A1* | 12/2003 | Moutafov | ............... | G06F 9/547 709/227 |
| 2006/0136197 A1* | 6/2006 | Oon | ...................... | G06F 17/241 704/9 |
| 2007/0234294 A1* | 10/2007 | Gooding | ............. | G06F 11/3664 717/124 |

(Continued)

*Primary Examiner* — Oscar A Louie
*Assistant Examiner* — Oluwatosin M Gidado
(74) *Attorney, Agent, or Firm* — Zilka-Kotab, P.C.

(57) ABSTRACT

In one embodiment, a system includes at least one processor and logic integrated with and/or executable by the processor, the logic being configured to instantiate, using an interface definition language (IDL) on a first server, a remote procedure call (RPC) function to exchange information between the first server and a second server, generate at least one stub on the first server using the RPC, and generate at least one stub on the second server using the RPC, wherein the at least one stub generated on the second server does not perform any marshalling or un-marshaling of data when endianess of the two servers is the same. Other systems, methods, and computer program products for exchanging information between servers using RPCs are described in more embodiments.

20 Claims, 5 Drawing Sheets

(56) References Cited

U.S. PATENT DOCUMENTS

| | | | |
|---|---|---|---|
| 2008/0209436 A1* | 8/2008 | Agha | G06F 11/3632 |
| | | | 718/106 |
| 2009/0064207 A1* | 3/2009 | Sigal | G06F 9/544 |
| | | | 719/330 |
| 2009/0275354 A1* | 11/2009 | Bulmer | G06F 1/3203 |
| | | | 455/522 |
| 2010/0011383 A1* | 1/2010 | Abdul Kader Jailani | |
| | | | H04L 41/0846 |
| | | | 719/330 |
| 2013/0036192 A1 | 2/2013 | Fausak | |
| 2013/0091203 A1* | 4/2013 | Araki | G06F 9/547 |
| | | | 709/203 |
| 2014/0040924 A1* | 2/2014 | Jordahl | G06F 9/547 |
| | | | 719/330 |
| 2014/0229114 A1* | 8/2014 | Singh | G06F 19/26 |
| | | | 702/19 |

* cited by examiner

AUTOMATICALLY GENERATING EFFICIENT REMOTE PROCEDURE CALL (RPC) CODE FOR HETEROGENEOUS SYSTEMS

BACKGROUND

The present invention relates to remote procedure calls (RPCs), and more particularly, this invention relates to auto-generating efficient RPC code for heterogeneous systems.

Existing RPC tools generate server stubs and client stubs based on a proprietary interface definition language (IDL). The generated code is configured for marshalling and un-marshalling on both the client side and the server side as the transmitted data is always in network order (e.g., big-endian). Marshalling may include transforming a memory representation of an object or objects to a data format suitable for storage or transmission, and is typically necessary for transporting data between processes, containers, and/or threads. Un-marshalling generally includes the opposite action of transforming the memory representation back into a data format suitable for storage or transmission. Furthermore, a type-length-value (TLV) encoding scheme is used in order to support versioning of the offered application programming interface (API) as well as the related data structures. The drawbacks of this approach are several, including overhead of marshalling and un-marshalling on both sides which is undesirable, e.g., client and server resources are utilized, runtime is increased, etc. Also, the overhead related to conversion between TLV and raw data structure is required by the caller and callee, which is also undesirable.

Accordingly, it would be beneficial to have more efficient RPC code for heterogeneous systems.

SUMMARY

In one embodiment, a system includes at least one processor and logic integrated with and/or executable by the processor, the logic being configured to instantiate, using an interface definition language (IDL) on a first server, a remote procedure call (RPC) function to exchange information between the first server and a second server, generate at least one stub on the first server using the RPC, and generate at least one stub on the second server using the RPC, wherein the at least one stub generated on the second server does not perform any marshalling or un-marshaling of data when endianess of the two servers is the same.

In another embodiment, a computer program product for exchanging information includes a computer readable storage medium having program instructions embodied therewith, the program instructions being readable and/or executable by at least one processor to cause the at least one processor to instantiate, using the at least one processor and an IDL on a first server, a RPC function to exchange information between the first server and a second server, generate, using the at least one processor, at least one stub on the first server using the RPC, and generate, using the at least one processor, at least one stub on the second server using the RPC, wherein the at least one stub generated on the second server does not perform any marshalling or un-marshaling of data when endianess of the two servers is the same.

According to another embodiment, a method for exchanging information includes instantiating, using an IDL on a first server, a RPC function to exchange information between the first server and a second server, wherein the first and second servers have heterogeneous characteristics, generating at least one stub on the first server using the RPC, and generating at least one stub on the second server using the RPC, wherein the at least one stub generated on the second server does not perform any marshalling or un-marshaling of data when endianess of the two servers is the same, and wherein the at least one stub generated on the second server indicates endianess of data on the second server using a byte in a message header of a message received by the first server.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes at least one processor and logic integrated with and/or executable by the processor, the logic being configured to instantiate, using an interface definition language (IDL) on a first server, a remote procedure call (RPC) function to exchange information between the first server and a second server, generate at least one stub on the first server using the RPC, and generate at least one stub on the second server using the RPC, wherein the at least one stub generated on the second server does not perform any marshalling or un-marshaling of data when endianess of the two servers is the same.

In another general embodiment, a computer program product for exchanging information includes a computer readable storage medium having program instructions embodied therewith, the program instructions being readable and/or executable by at least one processor to cause the at least one processor to instantiate, using the at least one processor and an IDL on a first server, a RPC function to exchange information between the first server and a second server, generate, using the at least one processor, at least one stub on the first server using the RPC, and generate, using the at least one processor, at least one stub on the second server using the RPC, wherein the at least one stub generated on the second server does not perform any marshalling or un-marshaling of data when endianess of the two servers is the same.

According to another general embodiment, a method for exchanging information includes instantiating, using an IDL on a first server, a RPC function to exchange information between the first server and a second server, wherein the first and second servers have heterogeneous characteristics, generating at least one stub on the first server using the RPC, and generating at least one stub on the second server using the RPC, wherein the at least one stub generated on the second server does not perform any marshalling or un-marshaling of data when endianess of the two servers is the same, and wherein the at least one stub generated on the second server indicates endianess of data on the second server using a byte in a message header of a message received by the first server.

Figure 1:
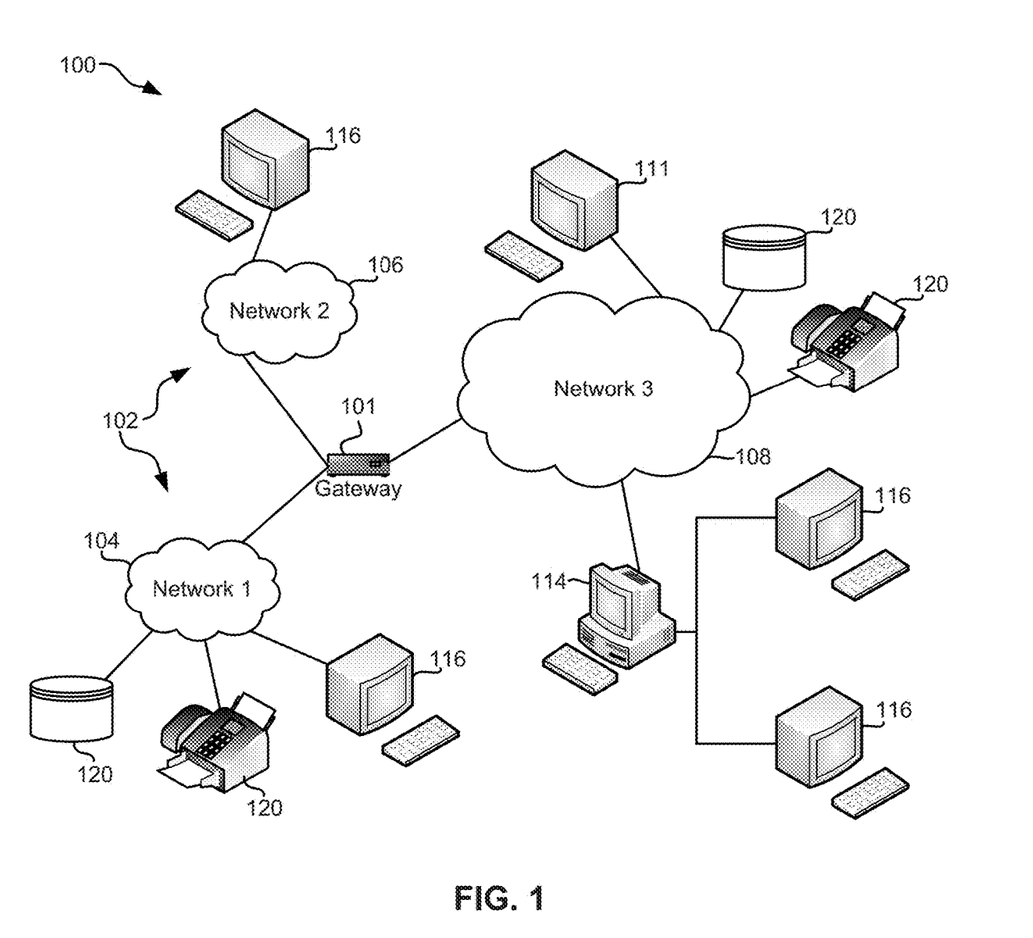
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
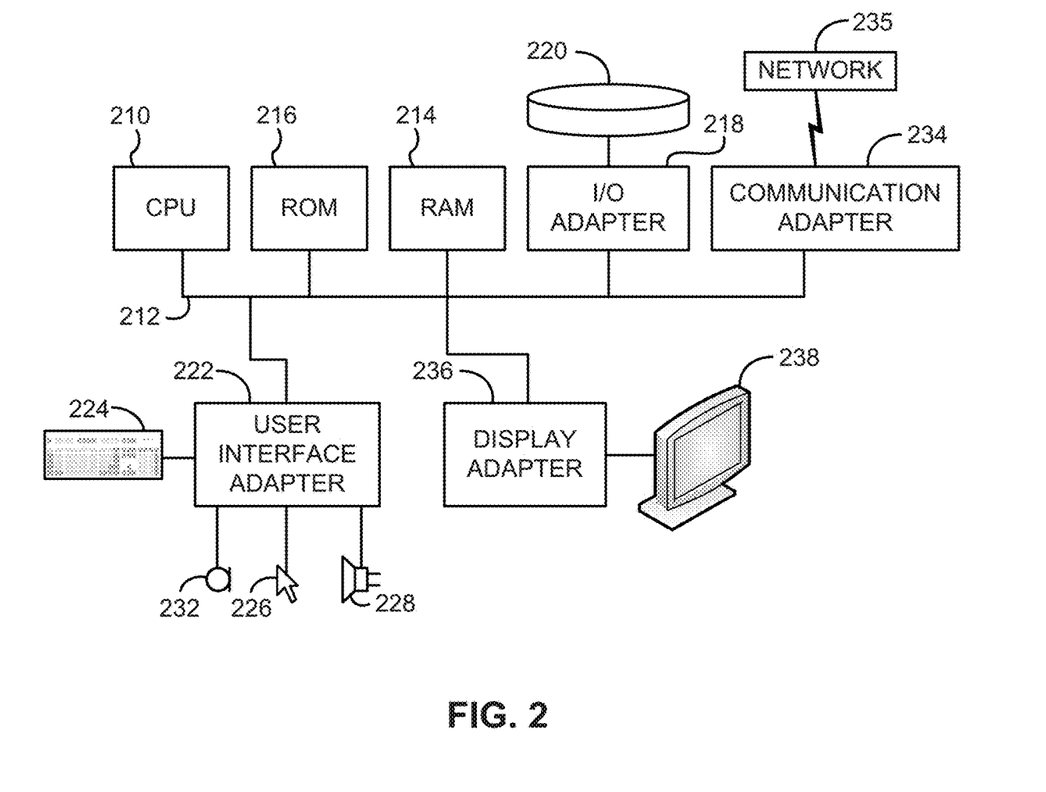
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

For the remainder of the descriptions provided herein, a subset of the C programming language is used for exemplary purposes. However, any programming language known in the art may be used in any of the embodiments described herein, as would be understood by one of skill in the art upon reading the present descriptions.

The subset of C language is used as an interface definition language (IDL). With this IDL, a developer, user, administrator, or some other suitably trained and knowledgeable person may define an API in a C header file. Since one purpose of this IDL is to enable this API as a remote procedure call (RPC), certain restrictions are implemented for the C language used to write the header file.

Each of these restrictions on the C language are discussed in more detail below, and may be included or excluded on an individual basis (e.g., there is no requirement that all or none of the restrictions be utilized).

1) Only declarations are allowed, with no definitions being allowed. This first restriction allows for only variable types to be presented, but no values may be given.
2) Only primitive types with fixed size may be used, including: char, uchar, int8, uint8, int16, uint16, int32, uint32, int64, uint64, float and double. This a subset of possible C language variable types.
3) Only single pointers are allowed, i.e., T* is allowed, but T, T*, etc. is not allowed. In this restriction, no double pointers, triple pointers, etc., may be used. In a more restrictive embodiment, no pointers are allowed at all.

4) No function pointers are allowed. A function pointer is a pointer which refers to another set of code, and are not allowed in this restriction.

5) Only arrays with known size at run time are allowed to be used.

6) Standalone union is not supported and must be included in a structure with a type/member tag. Union is a data type that overlaps two or more mapping types, and is not allowed in this restriction.

7) Limited support for preprocessor directives is allowed, e.g., only simple #define, #if, and #if defined( ) based on symbol existence. That means no #include, and no macro expansion preprocessor directives are allowed in this restriction.

The underlying interprocess communication (IPC) may be implemented using shared memory for the server and the client on the same computer system and/or TCP/IP sockets for the server and the client residing on different computer systems, which are connected, such as via Ethernet or some other suitable connection protocol known in the art.

In one embodiment, Doxygen-like tags, that is tags that are similar to and possibly based on the Doxygen tool, may be used to annotate metadata for an RPC function.

In one embodiment, @rpc <attrs> may be used as a function, where <attrs> may be one of async, timeout=<number in secs>, or batch. The first option (async) is used to indicate an asynchronous function. The second option (timeout) is used for a synchronous function and specifies the timeout for receiving the response data, whereas the default is infinite.

In addition, the last option (batch) informs the code generator to generate an additional function that accepts a list of servers and callback, which sends the RPC requests to given servers asynchronously and calls the callback to notify the caller for any returned response. This batch function may be called, e.g., by a configuration tool to set up a plurality of switches with the same function call.

In another embodiment. @param[in,out,size=<number>] may be used as a function parameter. This tag is used to specify when a class methods parameter is an input and/or an output. For a parameter of a pointer type, the size attribute specifies the number of elements.

The client stubs generated by the code generator do not perform any marshalling or un-marshalling when endianess of the two servers is the same. Instead, these stubs put a byte in a message header to indicate the client's "endianess," i.e., a characteristic of little endian or big endian (indicating the host byte order of the local CPU architecture). The server stubs generated by the code generator will examine this byte when receiving a RPC request. When the client has the same endianess as the server, the received data may be used directly without any conversion. Otherwise, conversion of the data into the endianess format of the receiving server is performed. This same method is applied for output data to be sent to the client. This approach eliminates the overhead of marshalling and un-marshalling on both sides except when it is necessary, instead of being required each time.

The code generator described herein according to various embodiments uses a modified TLV format to encode the data structures before any transmission. In one embodiment, the TLV format may have the following structure.

Number of TL records
Each TL record is a pair of type (2 bytes) and length (4 bytes)
. . .
Last TL record
Data structure as is The number of TL records is used to determine the length in bytes of the TL records which follow thereafter, and hence the address of the following data structure. In most cases, the client and server use the same version of API. Therefore, the data structure may be passed directly to the callee (input parameter) and caller (output parameter) without the need to convert each value in TLV format into a data structure consumable for the callee and caller.

Figure 3:
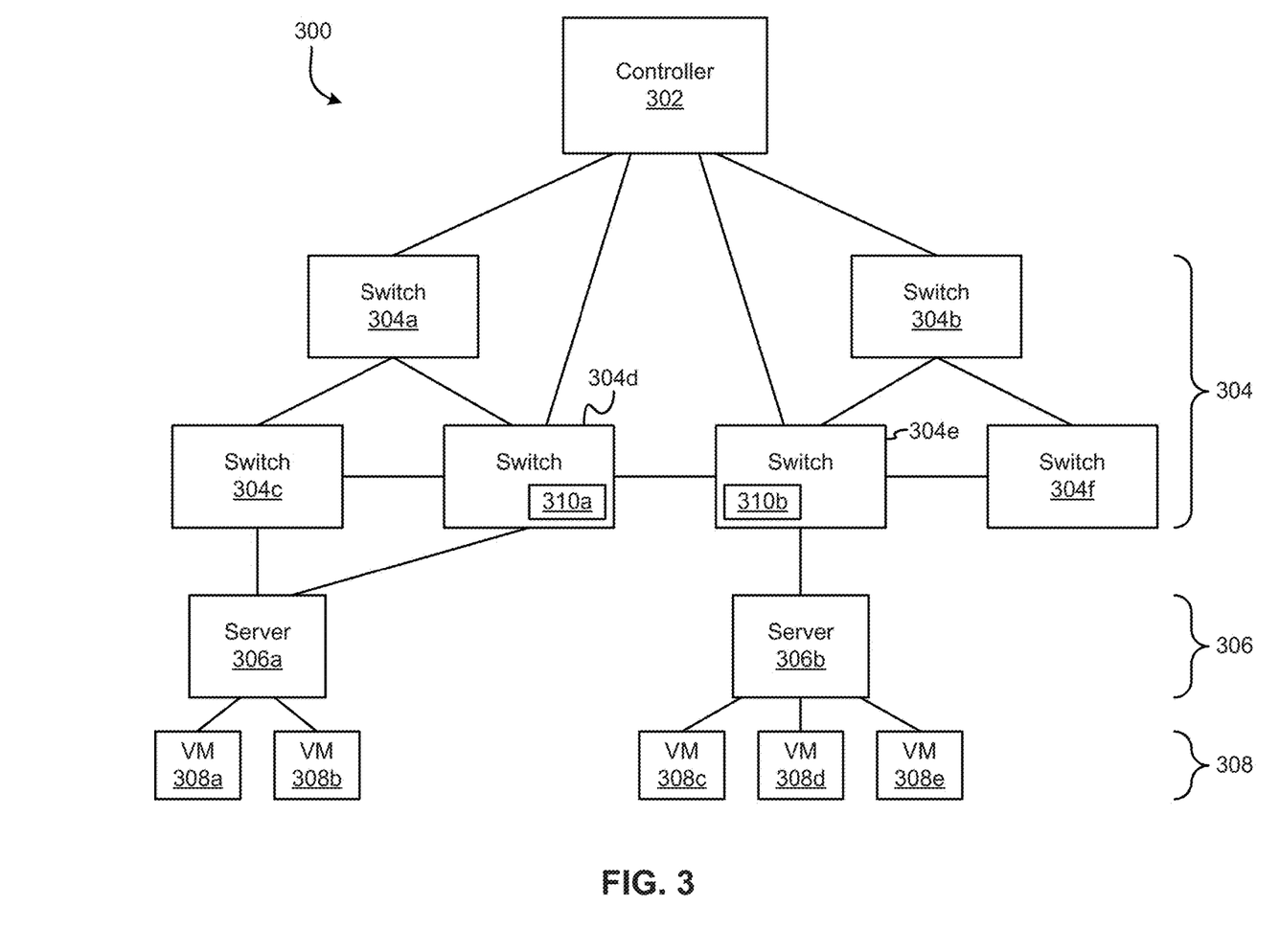
FIG. 3 is a simplified diagram of a system, according to one embodiment.

Now referring to FIG. 3, a system 300 is shown according to one embodiment, in which information may be exchanged between any two devices using the RPC as described herein in various embodiments.

In one embodiment, the system 300 includes a controller 302 connected to one or more switches 304, specifically switch 304a and switch 304b as shown in FIG. 3, a plurality of switches 304a, 304b, . . . 304f, interconnected in any arrangement known in the art, one or more servers 306, e.g., server 306a, server 306b, etc., connected to one or more of the switches 304, and a plurality of virtual machines (VMs) 308 connected to one or more of the servers 306.

In this arrangement, information may be shared between memory complexes of two or more of the devices in the system 300 using a RPC as described herein. For example, information may be exchanged between the controller 302 and switch 304a, between switch 304c and switch 304d, between switch 304c and server 306a, etc. As shown, switch 304d includes a memory complex 310a, while switch 304e includes a memory complex 310b. When information is to be exchanged between these memory complexes, a RPC may be used, as described in more detail in FIG. 4.

Figure 4:
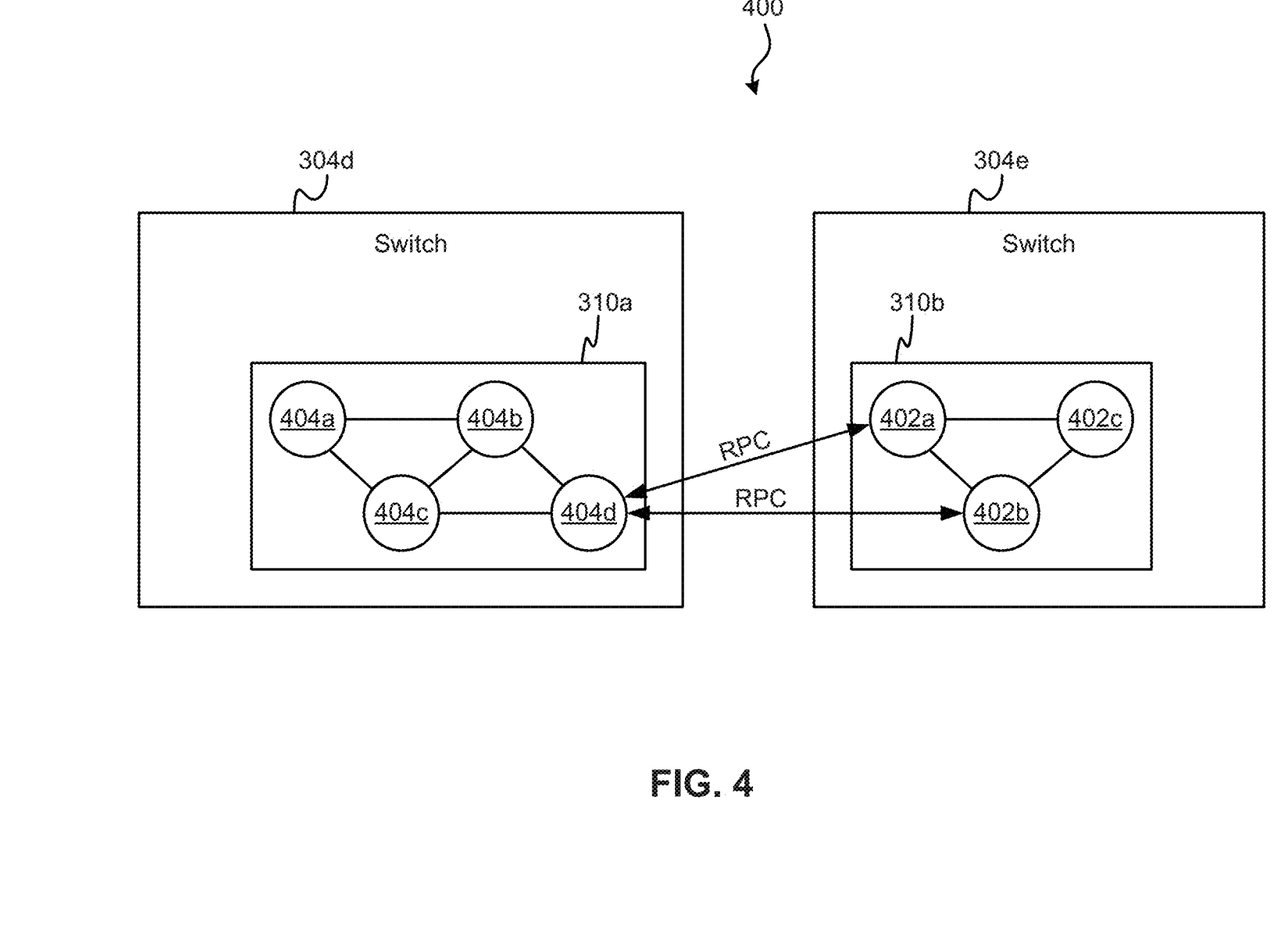
FIG. 4 shows an exchange of data using a remote procedure call (RPC), according to one embodiment.

In FIG. 4, an exchange of information 400 is shown between memory complex 310a of switch 304d and memory complex 310b of switch 304e. By exchanging information, information may be sent and/or received by either side of the exchange by a process or container (individually represented by 404a, 404b, . . . , 404d) in memory complex 310a and 402a, 402b, 402c in memory complex 310b). What is exchanged and in which direction the exchange occurs at any given time may depend on the needs and requirements of the individual processes being executed independently and/or containers in the memory complexes.

Specifically, as shown in FIG. 4, information is being exchanged between process 404d of memory complex 310a and process 402a of memory complex 310b. In addition, process 402b of memory complex 310b is shown exchanging information with process 404d of memory complex 310a. Any memory complex may exchange information, such as a CPU memory complex, ASIC memory complex, or any other memory complex capable of supporting one or more independent processes and/or containers therein.

Figure 5:
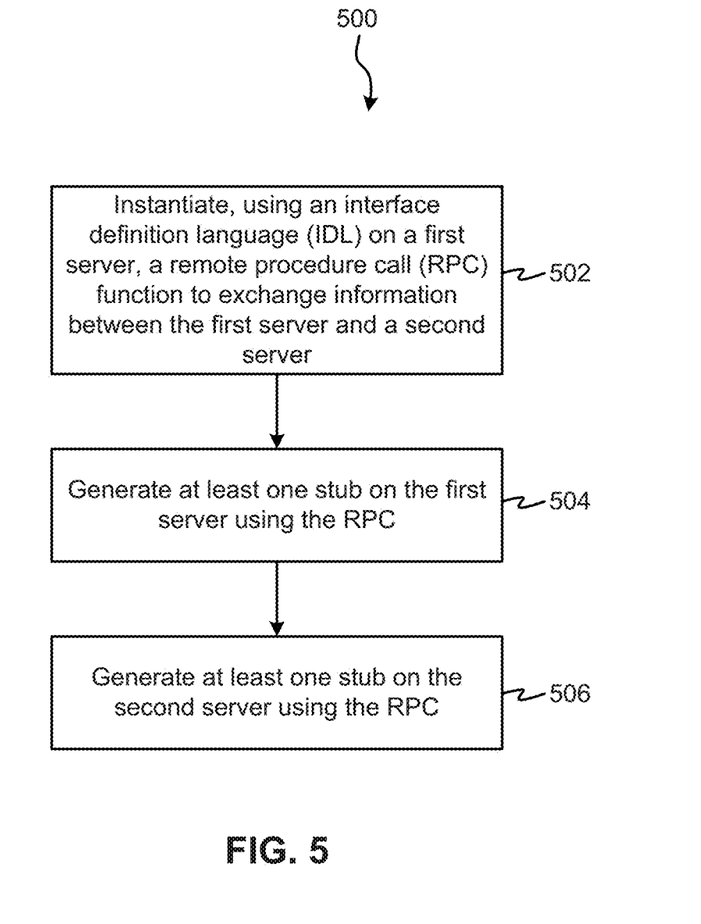
FIG. 5 shows a flowchart of a method, according to one embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a controller, a processor (such as a CPU, an ASIC, an FPGA, etc.), a module, a function block, a switch, a router, etc., in various approaches.

As shown in FIG. 5, method 500 may initiate with optional operation 502, where a RPC function is instantiated, using an IDL on a first server, to exchange information between the first server and a second server. In this embodiment, the second server may be located remotely from the first server, or may be located locally to the first server, such as being hosted on the same hardware but being a different VM from the first server, a different process than the first server, a different container than the first server, etc. Each sever comprises one or more independent processes and/or containers, and information may be exchanged between these independent processes and/or containers, as deemed useful to the particular server.

In one approach, the first server may adhere to different protocols, standards, be manufactured by a different manufacturer, or in some other way have a different characteristic from the second server, e.g., the servers have one or more heterogeneous characteristics.

The IDL may be provided using a subset of C programming language, as described in more detail herein in various embodiments. For example, the subset of C programming language may include one or more of: single-level pointers only, array with known size at runtime, no function pointers, only primitive variable types, and only declarations without definitions.

In operation 504, at least one stub is generated on the first server using the RPC. This stub may be used for gathering and sending information from one or more independent processes and/or containers on the first server to the second server.

Any of the stubs described herein may be a piece or string of code that is utilized to convert parameters and/or variables passed during the RPC, as would be understood by one of skill in the art.

In operation 506, at least one stub is generated on the second server using the RPC. This stub may be used for gathering and sending information from one or more independent processes and/or containers on the second server to the first server.

The at least one stub generated on the second server does not perform any marshalling or un-marshalling of data in these embodiments, and therefore requires less resources on the second server than when marshalling and un-marshaling is required.

Furthermore, in one approach, the at least one stub generated on the second server may indicate endianess of data on the second server using a byte in a message header of a message received by the first server, or through some other identifiable manner understood by the first and second server utilizing the RPC.

The RPC may use a modified TLV format to encode data structures for exchanging data between the servers. In one example, the modified TLV format may comprise tuples having a type and length, without a value, to allow values to be passed directly between the first server and the second server when there is no version conflict.

In another embodiment, the method 500 may include examining the byte in the message header to determine any endianess difference between the second server and the first server using the first server, using data provided by the second server without conversion when the endianess of the second server matches endianess of the first server, and/or converting the data provided by the second server to an endianess which matches the endianess of the first server when the endianess of the second server does not match the endianess of the first server. The data provided by the second server may include any data deemed usable by the first server, using the RPC, that may be exchanged between the second server and the first server. Converting the data may include switching from little endian to big endian, or switching from big endian to little endian, as would be understood by one of skill in the art upon reading the present descriptions.

Furthermore, the method 500 may also include sending data from the first server to the second server without conversion when the endianess of the second server matches the endianess of the first server, and/or converting the data from the first server to the endianess of the second server when the endianess of the second server does not match the endianess of the first server and sending the converted data from the first server to the second server. Converting the data may include switching from little endianess to big endianess, or switching from big endianess to little endianess, as would be understood by one of skill in the art upon reading the present descriptions.

The method 500, in another embodiment, may include using one or more tags to annotate metadata for the RPC function. The one or more tags may comprise at least one of @rpc <attrs>, and @param[in,out,size=<number>], wherein <attrs> may be async indicating an asynchronous function, timeout indicating a synchronous function that times out in a predetermined number of seconds, and batch indicating a function which accepts a list of servers, sends RPC requests to each server asynchronously, and calls a callback function to notify a caller of any returned response to the RPC requests.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising at least one processor; and logic integrated with the processor, executable by the processor, or integrated with and executable by the processor, the logic being configured to:

instantiate, using an interface definition language (IDL) on a first server, a remote procedure call (RPC) function to exchange information between the first server and a second server;

generate at least one stub on the first server using the RPC function;

using data provided by the second server at the first server without performing marshalling or un-marshalling of the data in response to determining that an endianness of the second server matches an endianness of the first server; and performing marshalling or un-marshalling of the data provided by the second server in order to convert the data to an endianness which matches the endianness of the first server in response to determining that the endianness of the second server does not match an endianness of the first server.

2. The system as recited in claim 1, wherein:
an indication of the endianness of the second server is one of big endian or little endian,
the indication of the endianness is included as a byte located in a header of an RPC request received from the second server,
the byte indicates a host byte order of a local CPU architecture of the second server, and
the at least one stub on the first server examines the byte in response to receiving the RPC request from the second server.

3. The system as recited in claim 2, wherein the logic is further configured to:
send additional data from the first server to the second server without performing marshalling or un-marshalling of the additional data in response to determining that the endianness of the second server matches the endianness of the first server; and
perform marshalling or un-marshalling of the additional data to convert the additional data before sending the converted additional data to the second server in response to determining that the endianness of the second server does not match the endianness of the first server.

4. The system as recited in claim 1, wherein one or more tags are used to annotate metadata for the RPC function.

5. The system as recited in claim 1, wherein the IDL is provided using a subset of C programming language.

6. The system as recited in claim 5, wherein the subset of C programming language comprises at least: single-level pointers only, array with known size at runtime, no function pointers, only primitive variable types, and only declarations without definitions.

7. The system as recited in claim 1, wherein the RPC function uses a modified type-length-value (TLV) format to encode data structures for changing data between the first server and the second server, where:
the modified TLV format comprises tuples having a type and length without a value to allow values to be passed directly between the first server and the second server in response to determining that there is no endianness conflict.

8. The system as recited in claim 1, wherein:
the marshalling includes transforming a memory representation of an object or objects to a data format suitable for storage or transmission, and
the un-marshalling includes transforming the memory representation of the object back from the data format suitable for storage or transmission.

9. The system as recited in claim 1, wherein the logic is further configured to use one or more tags to annotate metadata for the RPC function, the one or more tags being selected from a group of tags comprising:
"@rpc <attrs>," and
"@param[in,out,size=<number>]," where:
"@param" is a function parameter used to specify a class method's parameter as an input, output, or input and output,
"size=<number>" is used to denote a pointer parameter having a predetermined number of elements denoted by "<number>,"
"@rpc <attrs>" is used to denote a function "<attrs>" that is selected from a group of functions comprising:
"async," indicating an asynchronous function,
"timeout=<number of secs>," indicating a synchronous function that times out in a predetermined number of seconds denoted by <number of secs>, and
"batch," indicating a function which accepts a list of servers, sends RPC requests to each server asynchronously, and calls a callback function to notify a caller of any returned response to the RPC requests.

10. A computer program product for exchanging information, the computer program product comprising a computer readable storage medium having program instructions embodied therewith, the program instructions being readable, executable, or readable and executable by at least one processor to cause the at least one processor to:
instantiate, by the at least one processor and an interface definition language (IDL) on a first server, a remote procedure call (RPC) function to exchange information between the first server and a second server;
generate, by the at least one processor, at least one stub on the first server using the RPC function;
use, by the at least one processor, data provided by the second server at the first server without performing marshalling or un-marshalling of the data in response to determining that an endianness of the second server matches an endianness of the first server; and
perform, by the at least one processor, marshalling or un-marshalling of the data provided by the second server in order to convert the data to an endianness which matches the endianness of the first server in response to determining that the endianness of the second server does not match an endianness of the first server.

11. The computer program product as recited in claim 10, wherein:
an indication of the endianness of the second server is one of big endian or little endian,
the indication of the endianness is included as a byte located in a header of an RPC request received from the second server,
the byte indicates a host byte order of a local CPU architecture of the second server, and
the at least one stub on the first server examines the byte in response to receiving the RPC request from the second server.

12. The computer program product as recited in claim 11, wherein the program instructions are further readable, executable, or readable and executable by the at least one processor to:
send, by the at least one processor, additional data from the first server to the second server without performing marshalling or un-marshalling of the additional data in response to determining that the endianness of the second server matches the endianness of the first server; and perform, by the at least one processor, marshalling or un-marshalling of the additional data to convert the additional data before sending the converted additional data to the second server in response to determining that the endianness of the second server does not match the endianness of the first server.

13. The computer program product as recited in claim 10, wherein or more tags are used to annotate metadata for the RPC function.

14. The computer program product as recited in claim 10, wherein the IDL is provided using a subset of C programming language.

15. The computer program product as recited in claim 14, wherein the subset of C programming language comprises at least: single-level pointers only, array with known size at runtime, no function pointers, only primitive variable types, and only declarations without definitions.

16. The computer program product as recited in claim 10, wherein the RPC function uses a modified type-length-value (TLV) format to encode data structures for changing data between the first server and the second server, where:

the modified TLV format comprises tuples having a type and length without a value to allow values to be passed directly between the first server and the second server in response to determining that there is no endianness conflict.

17. The computer program product as recited in claim 10, wherein:

the marshalling includes transforming a memory representation of an object or objects to a data format suitable for storage or transmission, and the un-marshalling includes transforming the memory representation of the object back from the data format suitable for storage or transmission.

18. The computer program product as recited in claim 10, wherein the program instructions are further readable, executable, or readable and executable by the at least one processor to use, by the at least one processor, one or more tags to annotate metadata for the RPC function, wherein the one or more tags are selected from a group of tags comprising:

"@rpc <attrs>," and

"@param[in,out,size=<number>]," where:

"@param" is a function parameter used to specify a class methods parameter as an input, output, or input and output, "size=<number>" is used to denote a pointer parameter having a predetermined number of elements denoted by "<number>," and wherein "@rpc <attrs>" is used to denote a function "<attrs>" that is selected from a group of functions comprising:

"async," indicating an asynchronous function,

"timeout=<number of secs>," indicating a synchronous function that times out in a predetermined number of seconds denoted by <number of secs>, and "batch," indicating a function which accepts a list of servers, sends RPC requests to each server asynchronously, and calls a callback function to notify a caller of any returned response to the RPC requests.

19. A method for exchanging information, the method comprising:

instantiating, using an interface definition language (IDL) on a first server, a remote procedure call (RPC) function to exchange information between the first server and a second server, wherein the first and second servers have heterogeneous characteristics;

generating at least one stub on the first server using the RPC function;

using data provided by the second server at the first server without performing marshalling or un-marshalling of the data in response to determining that an endianness of the second server matches an endianness of the first server; and performing marshalling or un-marshalling of the data provided by the second server in order to convert the data to an endianness which matches the endianness of the first server in response to determining that the endianness of the second server does not match an endianness of the first server.

20. The method as recited in claim 19, further comprising sending additional data from the first server to the second server without conversion in response to a determination that the endianness of the second server matches the endianness of the first server;

converting the additional data from the first server to the endianness of the second server in response to a determination that the endianness of the second server does not match the endianness of the first server; and sending the converted additional data from the first server to the second server, wherein the IDL is provided using a subset of C programming language comprising at least: single-level pointers only, array with known size at runtime, no function pointers, only primitive variable types, and only declarations without definitions.

* * * * *